Sept. 27, 1955         E. G. DUERINGER         2,718,970
METHOD OF UNLOADING STORED MATERIAL AND APPARATUS THEREFOR
Filed Oct. 29, 1953         2 Sheets-Sheet 1
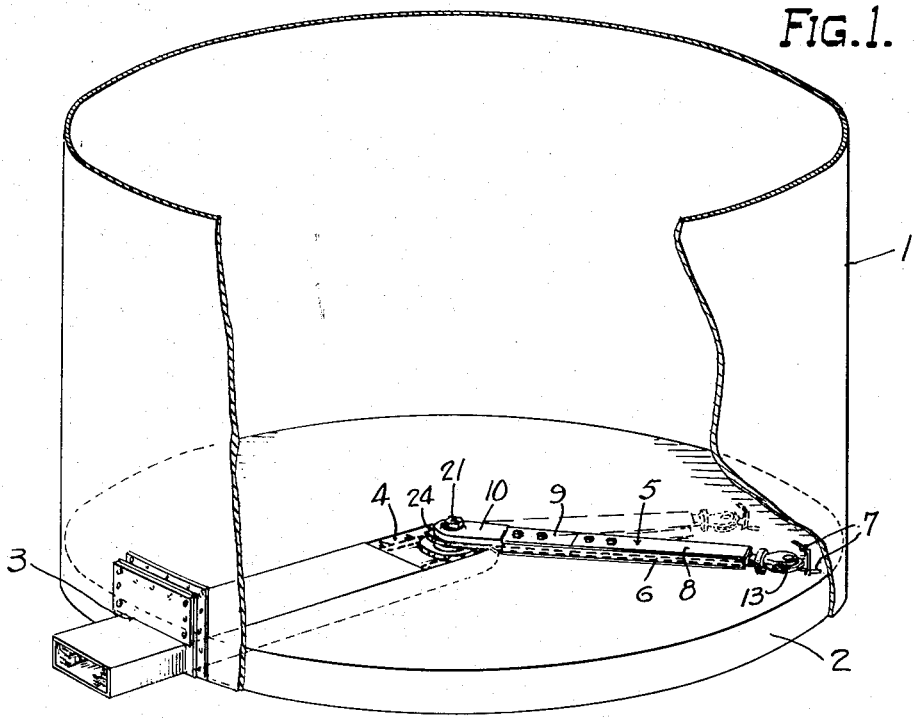
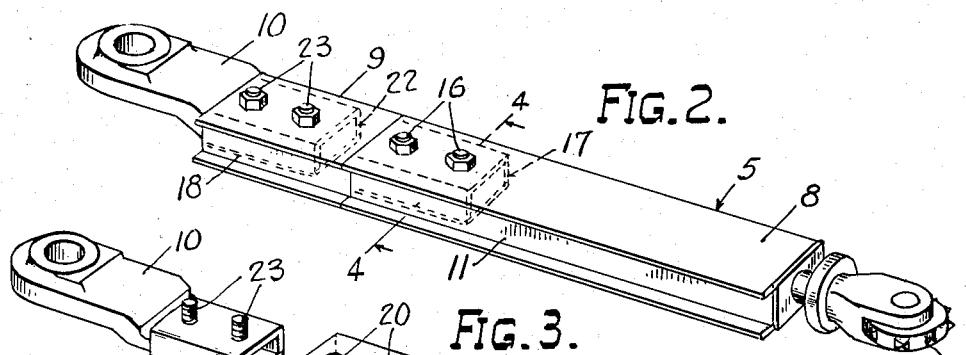
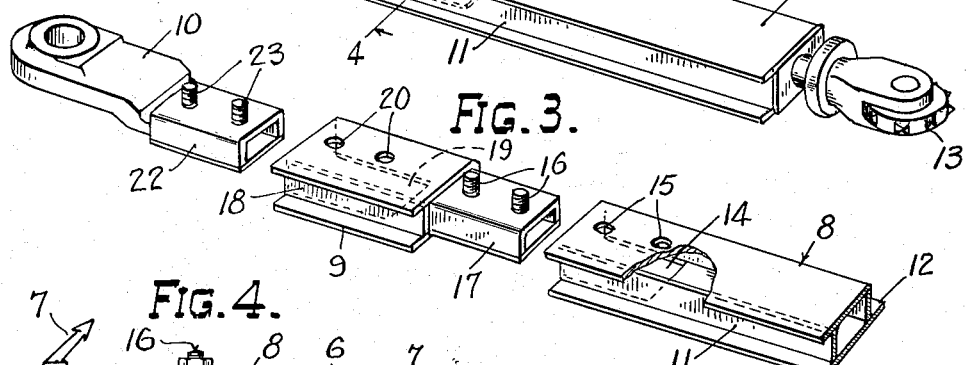
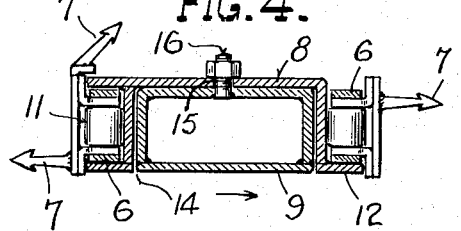
INVENTOR.
Erwin G. Dueringer
BY
*Andrus & Sceales*
ATTORNEYS.

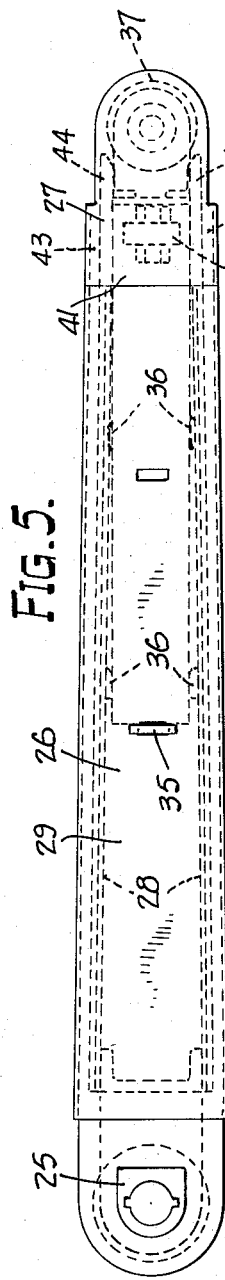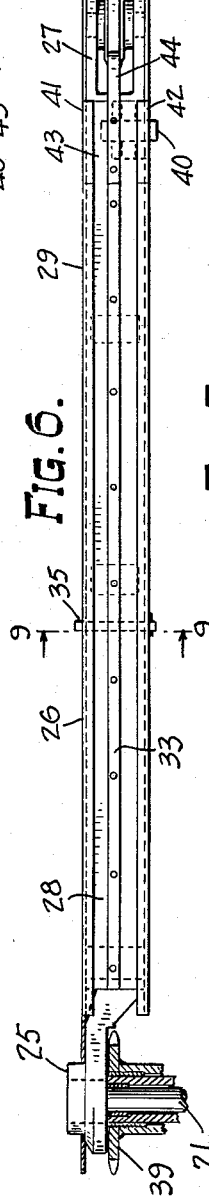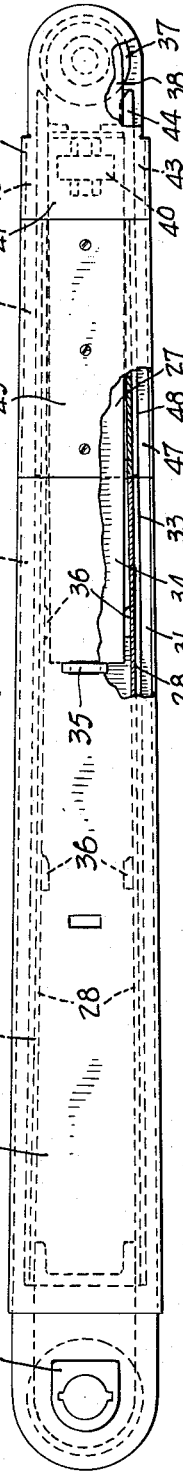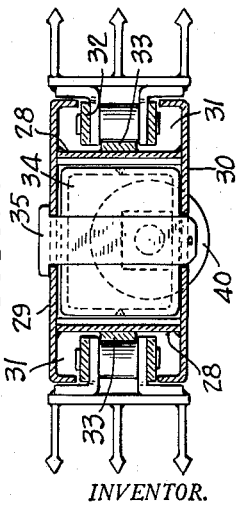
INVENTOR.
Erwin G. Dueringer
BY
ATTORNEYS.

United States Patent Office
2,718,970
Patented Sept. 27, 1955

2,718,970

METHOD OF UNLOADING STORED MATERIAL AND APPARATUS THEREFOR

Erwin G. Dueringer, Milwaukee, Wis., assignor to A. O. Smith Corporation, Milwaukee, Wis., a corporation of New York Application October 29, 1953, Serial No. 389,004

8 Claims. (Cl. 214—17)

This invention relates generally to unloading material which is stored in a storage structure and particularly to unloading material from a storage structure which has disposed in the bottom thereof a mechanical means for dislodging the material and delivering the same to outside the storage structure.

The invention is particularly well adapted to unloading silage from the bottom of cylindrical storage structure such as for instance, a silo. Silage, and particularly grass silage, has a tendency to become packed at the bottom of the silo if permitted to stand for any appreciable length of time, due to the weight of the column of silage.

One form of mechanical means for unloading stored silage from the bottom of a silo comprises in general, a cutter arm and a conveyor. The cutter arm is disposed above the conveyor and is rotatable around the bottom of the silo, while simultaneously, a plurality of cutter teeth disposed on the arm, move longitudinally of the arm, cut into and move the dislodged silage to the inner end of a trough disposed in the bottom of silo from where the conveyor moves the dislodged silage longitudinally along the trough to an opening disposed in the wall of the silo for delivery of the stored material to outside the storage structure.

Substantially all types of silage have a tendency to compact at the bottom of the silo and this is particularly true of grass silage wherein the grass has been previously cut into pieces of substantially short lengths and then blown into the silo. The short lengths of grass generally fall downwardly within the silo and come to rest in a plurality of horizontaly disposed layers in which the particles of grass are intertwined into a mass of crisscross layers. The silage at the bottom of the silo becomes of maximum density because of the weight of the column of silage, and tests have disclosed that once this compacting tendency of the stored material at the bottom of the silo has begun, it becomes progressively worse, making it extremely difficult for the silage to flow downwardly so that the unloader mechanism may cut the same and deliver it to the outside.

Tests have also proven that unloading silage from the bottom of a silo equipped with a bottom unloader is easier if the silage arches closely adjacent and above the bottom unloader. The reason for this appears to be that the narrow width of a circumferential ring of silage, disposed between the outer end of the cutter arm and the base of the silo, is incapable of holding the mass of silage in a static condition and therefore the silage will tend to flow downwardly so that the unloader may perform its function efficiently.

It has been observed that with certain types of silage that have been permitted to stand for any appreciable length of time before unloading begins, or between subsequent unloadings, the load that is encountered by the cutter arm, due to the compacting of the silage immediately adjacent and above the arm is sometimes very difficult to overcome. This invention solves this problem by providing a method and apparatus to remove portions of the lower layers of the stored silage consecutively, to the end that the bottom of the column of the remaining silage will arch above the unloader thereby placing the remainder of the silage column in a non-static condition so that it will flow or settle downwardly to be dislodged and delivered by the unloading mechanism.

The primary object of the invention is to provide a cutter arm for a mechanical unloader mechanism disposed in the bottom of a storage structure which is adjustable in length.

Another object is to provide a bottom unloader mechanism having a cutter arm with a removable part disposed therein and forming a part thereof whereby layers, of increasing diameters, of the stored material may be removed from the bottom of the material consecutively.

A further object is to provide a bottom unloader mechanism having a cutter arm which may be adjusted to different lengths to permit the formation of upwardly extending arches in the material operated upon by the unloader mechanism.

Another object is to provide a method for unloading stored material from the bottom of a storage structure by an unloader mechanism disposed in the bottom of the structure and in which a cutter arm is adjusted to different lengths to initially reduce the load on the mechanism to effect removal of the stored material.

These and other objects of the invention will appear hereinafter in connection with the following description of the drawings illustrating an embodiment of the invention.

In the drawings:

Figure 1 is a fragmentary perspective view of a silo with an unloader mechanism disposed in the bottom thereof;

Fig. 2 is a perspective view of the apparatus of the invention;

Fig. 3 is an exploded perspective view of the cutter arm with certain parts removed for clarity;

Fig. 4 is a transverse sectional view taken along line 4—4 of Fig. 2.

Fig. 5 is a top plan view of a modified form of the cutter arm with the arm in the shortened position;

Fig. 6 is a side elevation of the cutter arm of Fig. 5;

Fig. 7 is a top plan view of the cutter arm of Fig. 5 with the arm in the lengthened position and with parts broken away in section;

Fig. 8 is a fragmentary side elevation of the cutter arm as shown in Fig. 7; and Fig. 9 is a transverse section taken along line 9—9 of Fig. 6.

The invention comprises in general a bottom unloader apparatus incorporating a cutter arm which rotates about the bottom of a silo to cut and dislodge material stored in the silo and to remove the same to outside the structure. It has been observed that with a silo filled with material which is susceptible to packing substantially hard at the bottom of the silo, due to the weight of the column of silage, considerable difficulty is sometimes encountered in getting the cutter arm to rotate and perform its function in cutting into the silage and dislodging the same. This is because of the heavy load on the unloader mechanism. It has also been observed that the above difficulty may be overcome if a cutter arm of shorter length than the normal arm is initially installed and operated for a few revolutions. After the initial operation of the shorter cutter arm is completed, an insert is disposed between the hub section of the arm and the outer end of the arm thereby effecting a longer arm or one that would normally be used for the particular diameter of silo in which it operates.

The invention is illustrated as employed with a generally cylindrical storage structure such as a silo 1 which is secured to a flat-topped foundation 2 of concrete or the like providing a floor for the structure.

The lower portion of silo 1 is provided with an opening 3 for insertion of a suitable conveyor unit into a trough 4 provided in the foundation 2 and which extends from the opening 3 to substantially the center of the structure. The conveyor unit serves to conduct cut or dislodged silage from the center of the silo to the exterior.

The silage is dislodged by a cutter arm 5 which rotates around the inside of the storage structure and carries a revolving endless chain 6 having teeth 7 spaced thereon for cutting and dislodging the stored material.

The mechanism for driving the cutter arm and the endless conveyor is disposed outside the silo 1 and is not shown in the drawings. The driving mechanism forms no part of this invention and may be the type shown and described in application of Julius B. Tiedemann, Patent No. 2,635,770 and entitled "Method of Unloading Stored Material and Apparatus Therefor."

This invention is directed particularly to the cutter arm 5, shown in Figs. 1-4, which comprises a plurality of parts; namely, an outer arm section 8, an insert section 9, and a hub section 10. The outer arm section 8 is of substantially elongated hollow rectangular shape comprising top and bottom plates, a following side plate and a leading side plate. The top and bottom plates overhang the following side plate longitudinally of the outer arm section to provide a channel-shaped recess 11. The recess 11 provides a track in which endless roller chain 6 may travel, the rollers of the chain being permitted to ride along the surface of the following side plate of section 8. The opposite or leading side of the outer arm section 8 is provided with one overhang 12, namely from the bottom plate so that the cutter chain when in operation may travel along the overhang 12 and bear against the leading side plate. The pressure of the stored material against the cutter chain on the leading side of the cutter arm will serve to keep the chain in its proper place.

The outer end of the outer arm section is provided with a sprocket 13 which is preferably adjustable longitudinally of the arm to compensate for any looseness which might be present in the cutter chain or to bring the cutters within a predetermined distance of the inner surface of the silo wall as they rotate around the foundation. The inner end of the bottom plate of the outer arm section 8 has a cut-out 14 to receive insert 9 and the top plate is provided with a plurality of apertures 15 which are disposed immediately above the cut-out 14 in the bottom plate, and are adapted to receive threaded studs 16 as will be later explained.

Insert 9 is of a generally rectangular hollow shape and has disposed at the outer end thereof a hollow tongue member 17 which is adapted to be inserted in cut-out 14, the studs 16 being disposed in apertures 15 so that the outer arm section 8 and the insert 9 may be secured together as by suitable nuts threaded on the studs 16.

The inner end of insert 9 conforms in shape generally to the outer arm section and is formed of an upper plate, a lower plate, and side plates which correspond generally to the top, bottom and side plates of section 8. The following side of the insert section is provided with a channel-shaped recess 18 which is co-extensive with recess 11 when the outer arm section 8 and the insert section 9 are assembled.

The inner end of the bottom plate of insert section 9 is provided with a cut-out 19 for the reception of a portion of hub section 10 as will later be described. The top plate of insert 9 is provided with a plurality of apertures 20 disposed immediately above cut-out 19.

The inner end of hub section 10 is connected to a rotatable vertical shaft 21 which is driven through any suitable gearing and shafting by the driving mechanism disposed on the outside of silo 1. The outer end of the hub section is provided with a hollow generally elongated rectangular tongue 22 adapted to fit within cut-out 19 in the insert section 9. The upper surface of tongue 22 is provided with a plurality of threaded studs 23 which when disposed in apertures 20 and engaged by suitable nuts will secure the insert section 9 and the hub section 10 together.

Cutter chain 6 extends around the cutter arm 5 between sprocket 13 on the outer arm section 8 and sprocket 24 on drive shaft 21 and may be driven by mechanism similar to that shown in the above mentioned patent of Julius B. Tiedemann.

The utilization of the adjustable cutter arm of the invention generally occurs at the initial unloading of a filled silo and is accomplished in the following way. In order to establish bridging of the silage immediately above the unloader arm it is necessary to rotate a shortened cutter arm through the lowermost layers of the silage. To shorten the arm the insert section 9 is removed and the outer arm section 8 is secured to the hub section 10 by inserting the tongue 22 of the hub section into the cutout 14 of the outer arm section, the threaded studs 23 being disposed in apertures 15 where the two sections will be secured together by nuts. A link section of the cutter chain is next removed to shorten the chain so as to accommodate it to the shortened cutter arm. The tension of the chain may be adjusted by any suitable means.

To begin operation the shortened cutter arm which is disposed outside of the silo is initially locked in position immediately above its driving mechanism and the conveyor so that the cutter chain 6 is free to travel longitudinally of the cutter arm 5 but the arm is prevented from rotating around the shaft 21. The locked unloading mechanism is then inserted, with the hub section 10 leading, through opening 3 in the lower portion of the silo. The cutter chain is being driven at this time so that the teeth 7 carried thereon will cut a path into the silage inwardly toward the center of the structure. The entire unloading unit is gradually moved inwardly in the trough 4 in the foundation of the silo until the hub section 10 reaches the center of the silo. The cutter arm 5 is next unlocked so that it is free to rotate. The cutter arm is then rotated so that it completes two or three revolutions during which time a predetermined amount of silage is cut and removed from the silo while the lower portion of the silage remaining in the structure will bridge-over or arch above the unloading mechanism.

The unloader mechanism is next removed from the bottom of the silo through opening 3 and insert section 9 is reinstalled into position in the cutter arm to form an arm of greater length than the cutter arm heretofore used. The removable link section is next reinstalled in the cutter chain and tensioned to the desirable degree for proper operating conditions. The unloading mechanism is again inserted into the bottom of the silo and the opening 3 properly closed. With the unloading mechanism thus installed and the remaining silage bridged-over or arched above the mechanism, the longer rotating cutter arm may then be rotated to dislodge and feed out the stored material with considerably less effort than would be the case had the shorter cutter arm not been used previously to establish arching in the stored material. As the longer cutter arm rotates about the bottom of the silo the teeth 7 of the cutter chain 6 carried thereon remove the stored silage to within a predetermined distance of the silo wall, for instance, two or three inches, so that the remaining silage will break off in chunks or layers as the cutter arm rotates substantially freely beneath the silage.

A modified form of the cutter arm is shown in Figs. 5 through 9. In this embodiment the cutter arm includes, a hub section 25, corresponding to hub section 10 of the first embodiment, which is rotatably secured to drive shaft 21. The outer end of hub section 25 is secured within the inner end of a hollow housing 26 while the outer end of housing 26 telescopically receives the outer section 27. By extending or withdrawing the outer section 27 within housing 26 the length of the cutter arm can be correspondingly varied.

The housing 26 has an elongated, generally rectangular shape and is tapered slightly toward the outer end of the cutter arm. The housing is formed of a pair of spaced side plates 28 which are connected by a top plate 29 and a bottom plate 30. The top and bottom plates 29 and 30 extend laterally beyond side plates 28 and have flanged edge portions to provide a pair of recesses 31 on either side of the housing. Recesses 31 serve as a track in which the endless roller chain 32 may travel.

To guide the chain 32 within recesses 31 a rail or guide 33 is secured to each of the side plates 28 of the housing. The rollers of the chain 32 ride on the rail 33 and thus position the chain and decrease the friction of the chain travel.

Outer section 27 includes a hollow generally rectangular body 34 which is formed of side walls, a top plate and a bottom plate. Body 34 is slidably disposed within the outer end of housing 26 to vary the effective length of the cutter arm. As shown in the drawings, the body 34 may be positioned at one of two locations within the housing 26. This is accomplished by pin 35 which is disposed within aligned openings in plates 29 and 30 of the housing and serve as stops, thereby preventing inward displacement of the body 34 within the housing 26.

To guide the body 34 within the tapered housing 26, a series of spaced guides or shims 36 are secured to the inner surface of the housing. The body 26 rides on the guides 36 and the body is thereby firmly positioned within the housing.

The outer end of outer section 27 supports a sprocket 37 which carries the endless roller chain 32. The sprocket 37 is rotatably secured within a U-shaped plate 38 which is attached within the outer end of body 34. To permit the chain to engage the sprocket, the side plates of the body 34 terminate a slight distance inwardly of the sprocket 37. The chain 32 is driven by a drive sprocket 39 which is disposed about the drive shaft 21.

To aid in rotating the cutter arm within the silo, a roller 40 is rotatably secured transversely within the body 34 and projects downwardly therefrom. Roller 40 serves to ride along the floor of the storage structure or silo and in effect carries a portion of the weight of the cutter arm.

The outer section 27 is also provided with a top plate 41 and a bottom plate 42 which are generally flush and complementary with the top plate 29 and bottom plate 30 respectively of housing 26. The edge portions of plates 41 and 42 are flanged to provide a pair of recesses 43 on either side of the body which complement the recesses 31. The bottom plate 42 is provided with a suitable opening to accommodate the transverse roller 40.

To prevent the roller chain 32 from dipping inwardly toward the longitudinal axis of the cutter arm as the chain approaches the sprocket 37, a pair of guide rails 44 are secured to the side plates of body 34. Rails 44 complement rails 33 and extend outwardly to a position immediately adjacent the teeth of sprocket 37. By this construction the chain will not dip inwardly as it approaches the sprocket and will not wear a groove in the side plates of the body 26.

In the extended position of the cutter arm, as shown in Fig. 7, an extension top plate 45 and an extension bottom plate 46 are removably secured to the top and bottom surfaces of body 34. The extension plates 45 and 46 complement the upper plates 29 and 41 and the bottom plates 30 and 42, respectively. The plates 45 and 46 extend laterally of the body and are flanged to provide recesses 47 which complement the recesses 32 and 43. In addition, when the arm is extended a pair of guide rails 48 are removably secured to the side plates of body 34. Rails 48 complement rails 33 and 44 and in effect provide a continuous guiding surface for the roller chain throughout the length of the cutter arm.

The cutter arm of Figs. 5–9 operates similarly to that of the cutter arm of the first embodiment in unloading the stored material from the silo. Initially the shortened arm is rotated within the silo to establish an arched-over condition.

The arm is then removed from the silo, the chain disengaged and the body 34 of section 28 is withdrawn from the housing 26 to the extended position. Pin 35 is placed in the outer hole to maintain the body in the extended position and the plates 45 and 46 and guide rails 48 are then secured to the portion of the body extending outwardly of housing 26. The attachment of plates 45 and 46 and rails 48 provides a continuous guiding means extending throughout the length of the cutter arm for the roller chain.

The lenghtened roller chain is then re-engaged with the sprockets and in a manner similar to that described with respect to the first embodiment, the lengthened cutter arm is then inserted into the silo and rotated to dislodge the stored material at the base of the arch which was established through use of the shortened cutter arm.

The above described invention provides an adjustable cutter arm for a bottom unloader which is relatively cheap to manufacture and relatively simple to manipulate to attain a cutting arm of varying lengths. The invention likewise provides a method of forming bridging or arching in the stored silage and removing the same by using a bottom unloader having a cutter arm whose length may be varied to suit the size of structure being unloaded.

Various modes of carrying out the invention are contemplated as within the scope of the following claims particularly pointing out and distinctly claiming the subject matter which is regarded as the invention.

I claim:

1. Apparatus for unloading stored material from the bottom of a storage structure which comprises a base, a conveyor mounted on said base and adapted to move longitudinally thereof to transfer the stored material to the exterior of the structure, a cutter arm pivoted to one end of said base and adapted to rotate horizontally around the bottom of the structure, said arm having an adjustable length in a horizontal direction to selectively shorten or lengthen the same for cutting the stored material so that an upwardly extending arch may be formed in said material above the cutter arm by initial use of a shorter arm to reduce the load on the arm when the latter is in extended position, and power means connected to said conveyor and said arm to drive the same.

2. Apparatus for unloading stored material from the bottom of a storage structure which comprises a base, a conveyor mounted on said base and adapted to move longitudinally thereof to transfer the stored material, a cutter arm pivoted to one end of said base and disposed thereabove and adapted to rotate horizontally around the bottom of the structure, a section adapted to be disposed between the ends of said arm or removed therefrom to selectively shorten or lengthen the same in a horizontal direction so that an upwardly extending arch may be initially formed in said material above the cutter arm when the arm is at its shorter length to reduce the load on said arm during subsequent operation of the apparatus, said section having a tongue portion at one end thereof and a cut-out portion at the other end thereof, both said portions being adapted to co-operate with other portions of said arm to lengthen the same, and power means connected to said conveyor and arm to drive the same.

3. Apparatus for unloading stored material from the bottom of a storage structure which comprises a base, a conveyor mounted on said base and adapted to move longitudinally thereof to transfer the stored material, a horizontally rotatable cutter arm having a plurality of sections comprising a hub section pivoted to one end of said base, an outer arm section, and an insert section, said insert section being disposed between said hub and outer arm sections and adapted to be removed for predetermined longitudinal adjustment of the cutter arm, said arm when made up to its shorter length initially serving to bridge the stored material immediately thereabove to thereby reduce the load on said arm during subsequent operation when said insert section is utilized as part of the arm, a blade cutter chain disposed around the cutter arm and adapted to move longitudinally thereof to cut and dislodge the stored material, a channel-shaped recess disposed along one longitudinal edge of the arm and insert sections to retain the blade cutter chain in operative position, said recesses being co-extensive when the arm and insert sections are unitarily assembled, and power means connected to said conveyor and arm to drive the same.

4. Apparatus for unloading stored material from the bottom of a storage structure which comprises a base, a conveyor mounted on said base and disposed to move longitudinally thereof to move the stored material, a horizontally rotatable cutter arm having a plurality of sections comprising a hub section pivoted to one end of said base, an outer arm section, and an insert section, said insert section being disposed between said hub and outer arm sections and adapted to be removed for predetermined longitudinal adjustment of the cutter arm, said adjustable arm initially serving at its shorter length to form an upwardly extending arch in the material immediately thereabove to thereby reduce the load on said arm during subsequent operation when said insert section is utilized as part of the arm, a blade cutter chain disposed around the cutter arm and adapted to be moved longitudinally thereof to cut and dislodge the stored material, a channel-shaped recess disposed along one longitudinal edge of the arm and insert sections to retain the blade cutter chain in operative position, a flange extending outwardly from and longitudinally of the bottom opposite edge of the arm and insert sections over which the cutter chain rides, said recesses and flanges being co-extensive when the arm and insert sections are unitarily assembled, and power means connected to said conveyor and arm to drive the same.

5. The method of removing stored material from a storage structure of predetermined diameter by a mechanical unloader mechanism disposed at the bottom of the structure and beneath the material and having a longitudinally adjustable horizontally rotating cutter arm, which comprises the steps of cutting a radial path through the bottom layers of the material from the edge of the structure to the center thereof by utilizing a cutter arm of substantially lesser length than the radius of said structure, rotating said arm a plurality of times through the bottom layers of the stored material to cause the material disposed above the arm to bridge-over and the remainder of the material to assume a non-static condition to thereby reduce the load on said arm during subsequent operation, removing the unloader mechanism from the structure, adjusting said arm to lengthen the same to substantially the radius of the structure, disposing the unloading mechanism beneath the bridged-over material and rotating the adjusted arm beneath the material to dislodge the same and move the dislodged material to the outside of the storage structure.

6. The method of removing stored material from a storage structure of predetermined diameter by a mechanical unloader mechanism disposed at the bottom of the structure and beneath the material and having a horizontally rotatable cutter arm comprised of a plurality of sections including an insert section which comprises the steps of cutting a radial path through the bottom layers of the stored material from the edge of the structure to the center thereof by utilizing a cutter arm of substantially lesser length than the radius of said structure, rotating said arm a plurality of times through the bottom layers of the stored material to cause the material disposed above the arm to bridge-over and the remainder of the material to assume a non-static condition to thereby reduce the load on said arm during subsequent operation, removing the unloader mechanism from the structure, lengthening said arm by disposing an insert section therein, disposing the unloading mechanism with the lengthened arm beneath the bridged-over material and rotating the lengthened arm beneath the material to dislodge the same and move the dislodged material to outside the storage structure.

7. The method of removing stored material from the bottom of a storage structure which comprises removing circumferentially a central portion of the bottom layers of the material by horizontally rotating a cutter arm of predetermined length disposed within said structure beneath the material to cause the remaining material in the structure to bridge-over above the cutter and the remainder of the material to assume a non-static condition to thereby reduce the load on said arm during subsequent operation, removing the cutter arm from the structure and inserting a section in said arm to lengthen the same, disposing the lengthened arm beneath the remaining material and removing radially outwardly a further portion of the remaining material by rotating the cutter arm to permit the material to feed downwardly at a rate substantially corresponding to the rate of removal of the material.

8. Apparatus for unloading stored material from the bottom of a storage structure which comprises a base, a conveyor mounted on said base and adapted to move longitudinally thereof to transfer the stored material, a cutter arm pivoted to one end of said base and disposed thereabove and adapted to rotate horizontally around the bottom of the structure, said cutter arm comprising a hollow housing and an outer section telescopically connected with said housing to selectively shorten or lengthen the arm, and said arm initially serving to bridge the stored material immediately thereabove when the arm is in shortened position to thereby reduce the load on the arm during subsequent operation when said arm is in lengthened position, stop means associated with said housing for limiting the inward displacement of said outer section with respect to said housing, an endless chain carried by said arm and adapted to travel thereon, and a plurality of teeth connected to the chain at spaced intervals to cut and dislodge the silage as the arm rotates within the structure.

References Cited in the file of this patent

UNITED STATES PATENTS

| | | |
|---|---|---|
| 1,275,558 | Holmgreen | Aug. 13, 1918 |
| 1,676,389 | Fletcher | July 10, 1928 |
| 2,109,082 | Bowman | Feb. 22, 1938 |
| 2,189,670 | Lewis | Feb. 6, 1940 |
| 2,229,086 | Joy | Jan. 21, 1941 |